United States Patent [19]

Chiba et al.

[11] Patent Number: 5,429,899
[45] Date of Patent: Jul. 4, 1995

[54] MAGNETIC MATERIALS

[75] Inventors: Naoki Chiba; Koichiro Sagawa; Takashi Zama, all of Kawasaki; Yasuhiro Kimura, Tokyo, all of Japan

[73] Assignee: Kenrich Petrochemicals, Inc., Bayonne, N.J.

[21] Appl. No.: 877,816

[22] Filed: May 4, 1992

[51] Int. Cl.$^6$ ............................................. G03G 9/083
[52] U.S. Cl. ................................ 430/106.6; 430/110; 428/403; 428/407; 428/900; 428/694 BA
[58] Field of Search .................... 430/110, 106.6; 428/403, 407, 900, 694 BA

[56] References Cited

U.S. PATENT DOCUMENTS 4,415,630 11/1983 Kubota et al. .
4,550,054 10/1985 Yamauchi et al. .................. 428/328
4,833,033 5/1989 Sannohe et al. ..................... 428/407
4,990,276 2/1991 Bishop et al. .

FOREIGN PATENT DOCUMENTS 60-052859 3/1985 Japan .
4130328 5/1992 Japan .

OTHER PUBLICATIONS

Patent Abstracts of Japan, vol. 90, No. 16 (P-329), Jan. 23, 1985, & JP-59-162-627, Sep. 13, 1984, Yamaguchi Atsutaka, et al., "Magnetic Recording Medium".
Patent Abstracts of Japan, vol. 10, No. 82 (E-392)(2139), Apr. 2, 1986, & JP-60-229-306, Nov. 14, 1985, Yoshio Aoki, et al., "Surface Treatment of Magnetic Powder and Manufacture".
Patent Abstracts of Japan, vol. 8, No. 94 (M-293)(1531), Apr. 28, 1984, & JP-59-9101, Jan. 18, 1984, Satoshi Miyao, et al., "Rare Earth Magnetic Powder Applied with Surface Treatment and its Production".

*Primary Examiner*—Stevan A. Resan
*Attorney, Agent, or Firm*—Darby & Darby

[57] ABSTRACT

Herein are disclosed a resin magnet excellent in flow characteristics and magnetic properties comprising a surface modified magnetic powder in respect of which the surface of the magnetic powder particles has been coated uniformly with a surface modifying mixture consisting of a titanium oligomer and an organic acid ester, and a resin; a magnetic toner excellent in printing quality and resolution comprising a fine powder prepared by mixing and pulverizing a resin and such a surface-modified magnetic powder, and a fluidizing agent; a magnetic coating material comprising such a surface-modified magnetic powder, an organic binder, and a solvent; and a magnetic recording material excellent in magnetic and surface properties obtained by coating a substrate resin with a magnetic coating material comprising such a surface-modified magnetic powder, an organic binder, and a solvent.

1 Claim, No Drawings

MAGNETIC MATERIALS

BACKGROUND OF THE INVENTION

1. Field of the Invention

The present invention relates to magnetic materials, more particularly to a resin magnet, a magnetic toner, magnetic coating material, and a magnetic recording material.

2. Discussion of the Background

A variety of magnetic materials comprising magnetic powder dispersed in an organic matrix is recently known. Such magnetic materials are embodied typically as resin magnets, magnetic toners and magnetic recording materials.

These products will be reviewed below individually.

In the field of magnets, in order to improve moldability and fragility of conventional sintered magnets, there are used resin magnets prepared by kneading a magnetic powder and a resin. Resin magnets are divided into rubber magnets and plastic magnets, depending on the type of the resin used. However, both of rubber magnets and plastic magnets have the following problems attributable to the necessity of filling magnetic powder uniformly and compactly in an organic polymer matrix, i.e., (i) Density of a magnetic powder is lowered by the addition of a resin; (ii) Because of incoordinate wettability of a magnetic powder and a resin, dispersibility is poor, and viscosity rises during molding to deteriorate fluidity while causing nonuniformity; and (iii) Magnetic properties are deteriorated. Thus, the improvements over these difficulties have been desired.

For the development of static or magnetic latent images, which is one of the recording techniques, there are avilable a dry developing method and a wet developing method. Magnetic toner used in the dry developing method is an ultra-fine powder composed of fine magnetic particles, electric charge regulator particles and other necessary particles for providing various properties, such as particles of a fluidity improver, dispersed in a resin such as polyethylene or styrene-acrylic resin. There is also known a toner in which a colorant is directly attached to the surface of the particles of a magnetic powder, such as disclosed in Japanese Patent Application Kokai (Laid-Open) No. 60-26954.

The important properties to be possessed by a toner are, e.g., fixing properties, anti-block properties, developing properties, transfer properties, anti-offset properties and cleanabiity. In the case of a magnetic toner, the dispersed state of a magnetic powder in the binder affects the magnetic properties of the whole toner.

A magnetic recording material such as a magnetic disc or a magnetic tape is usually produced by kneading a magnetic powder such as a ferrite powder, an organic binder and a solvent to prepare a magnetic coating material and coating it on a substrate such as a resin sheet or film. In this operation, dispersibility of the magnetic powder in the organic binder greatly affects the magnetic properties or wear resistance of the magnetic recording material. Since, however, a magnetic powder is an inorganic matter having a large surface energy, it has poor affinity for a resin having a small surface energy and is therefore very bad in dispersibility if no treatment has been made.

The problem common to these materials is the necessity to further enhance dispersibility of a magnetic powder in the organic matrix. A solution to this problem is to subject a magnetic powder to a treatment for making the particle surface hydrophobic. Such surface treatment has usually been conducted by using a higher fatty acid or an appropriate coupling agent such as a silane coupling agent or a titanium coupling agent. In case of using a higher fatty acid, the acid does not directly react with the functional groups orientated on the surface of the inorganic matter and therefore no covalent bonds are formed. Further, there usually exists surface water on the surface of an inorganic matter, and a higher fatty acid is orientated on the surface with the interposition of the water layer, so that it tends to fall off. In case of using a conventional coupling agent, it is said that the agent forms covalent bonds with the functional groups on the surface of an inorganic matter, and when a surface treated filler is filled in a resin, the silane type coupling agent serves for improving strength of the resin while the titanium type contributes to bettering the working properties. Surface treatment of a magnetic powder is, in many cases, performed by using a titanium coupling agent, as for instance seen in Japanese Patent Application Kokai No. 60-229306, and the practical effect thereof has been actually confirmed. However, the currently used materials can not meet the performance requirements, and the further improvements on surface treating techniques are required.

SUMMARY OF THE INVENTION

Accordingly, an object of the present invention is to improve dispersibility of a magnetic powder when it is filled in an organic matrix, thereby to better the magnetic properties of the magnetic materials.

The present invention thus provides magnetic materials which satisfy the above object of the invention and other objects which will become apparent from the description of the invention given hereinbelow.

In an aspect of the present invention, there is provided a resin magnet comprising a surface modified magnetic powder in respect of which the suface of the magnetic powder particles has been coated uniformly with a surface modifying mixture consisting of a titanium oligomer and an organic acid ester, and a resin.

In another aspect of the present invention, there is provided a magnetic toner comprising a fine powder prepared by mixing and pulverizing a resin and such a surface-modified magnetic powder, and a fluidizing agent.

In a third aspect of the present invention, there is provided a magnetic coating material comprising such a surface-modified magnetic powder, an organic binder, and a solvent.

In a fourth aspect of the present invention, there is provided a magnetic recording material obtained by coating a substrate resin with a magnetic coating material comprising such a surface-modified magnetic powder, an organic binder, and a solvent.

DETAILED DESCRIPTION OF THE INVENTION

As a result of studies to attain the objects, the present inventors have found that a magnetic material having a titanium oligomer and an organic acid ester incorprated is excellent in such properties as dispersibility of a magnetic powder and magnetic properties, and have achieved the present invention on the basis of these findings.

Thus, the present invention relates to:

(a) a resin magnet comprising (i) 100 parts by weight of a surface-modified magnetic powder in respect of which the surface of the magnetic powder particles has been coated uniformly with a surface modifying mixture consisting of 1 part by weight of a titanium oligomer and 0.5 to 50 parts by weight of an organic acid ester in an amount of 0.01 to 10% by weight based on the said magnetic powder, and (ii) 4 to 50 parts by weight of a resin;

(b) a magnetic toner comprising (i) a fine powder having a particle size of 5 to 50 μm and prepared by mixing and pulverizing 5 to 200 parts by weight of a resin and 10 parts by weight of a surface-modified magneti powder in respect of which the surface of the magnetic powder particles has been coated uniformly with a surface modifying mixture consisting of 1 part by weight of a titanium oligomer and 0.5 to 50 parts by weight of an organic acid ester in an amount of 0.01 to 10% by weight based on the said magnetic powder, and (ii) 0.1 to 5% by weight based on the said fine powder of a fluidizing agent;

(c) a magnetic coating material comprising (i) a surface-modified magnetic powder in respect of which the surface of the magnetic powder particles has been coated uniformly with a surface modifying mixture consisting of 1 part by weight of a titanium oligomer and 0.5 to 50 parts by weight of an organic acid ester in an amount of 0.01 to 10% by weight based on the said magnetic powder, (ii) 15 to 60% by weight based on the said surface-modified magnetic powder of an organic binder, and (iii) a solvent in an amount of 1 to 5 parts by weight per 1 part by weight of the said organic binder; and (d) a magnetic recording material obtained by coating a substrate resin with a magnetic coating material comprising (i) a surface-modified magnetic powder in respect of which the surface of the magnetic powder particles has been coated uniformly with a surface modifying mixture consisting of 1 part by weight of a titanium oligomer and 0.5 to 50 parts by weight of an organic acid ester in an amount of 0.01 to 10% by weight based on the said magnetic powder, (ii) 15 to 60% by weight based on the said surface-modified magnetic powder of an organic binder, and (iii) a solvent in an amount of 1 to 5 parts by weight per 1 part by weight of the said organic binder.

The present invention will be described in detail below.

First, discussion is made on the resin magnet according to the present invention.

The titanium oligomers usable in this invention are basically not limited to the specific types; it is essential, however, that they have an ester exchange catalyst activity. One of typical examples of such oligomers is the titanium acylate polymer disclosed in Japanese Patent Application Kokai No. Hei 1-203470. It is also possible to use a titanium oligomer having no hydrophobic groups or no hydrolyzable groups like an alkoxyl group, or the one having a sulfonic acid residue or phosphoric ester residue in the side chain. Some examples of these titanium oligomers are shown below by way of structural formulae:

Linear type such as those having the following structural formula:

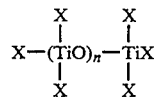

wherein n is 2—about 40.

Ladder type such as those having the following structural formulae:

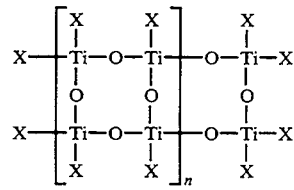

where in n is 1—about 40.

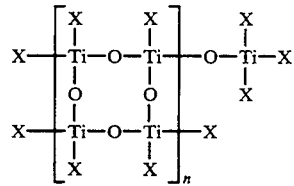

wherein n is 1—about 40.

Cyclic type such as those having the following structural formulae:

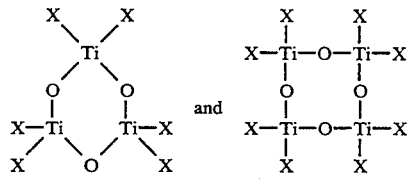

Highly condensed type having in the molecule the segment A:

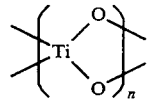

wherein n is 2—about 40; and the segment B:

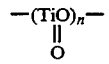

wherein n is 2—about 40.

In the above formulae, X's represent independently OH, an alkoxyl group, an acylate group, a sulfonic acid residue, a phosphoric ester residue or a pyrophosphoric ester residue.

It is also possible to use a mixture of these titanium oligomers.

The polymerization degree is somewhere between 2 and about 40, preferably between 5 and 30, for the reason that too low a polymerization degree gives a poor adsorption onto the filier while too high a polymerization degree gives a poor solubility in the resin or solvent.

The organic acid esters used in this invention are preferably the one in which the organic acid residue has hydrophobicity and the alcohol residue is of low molecular weight. Examples of the organic acid residues of said organic acid esters include fatty acids such as isostearic acid, stearic acid, palmitic acid, myristic acid, lauric acid, decanoic acid, octanoic acid, oleic acid and linoleic acid, and an alkanesulfonic acid having 5 to 20 carbon atoms, among which isostearic acid is preferred from the standpoint of providing hydrophobicity. Examples of the alcohol residues of said organic acid esters are an isopropyl, a propyl, an ethyl, a methyl, a butyl, an isobutyl, a t-butyl and the like alcohols, among which isopropyl alcohol is preferred for the reasons of high hydrolyzability and volatility after hydrolysis. The organic acid esters according to the present invention include further phosphoric acid esters and pyrophosphoric acid esters in respect of which at least one alcohol residue has the same carbon number as in the case of said fatty acids and still at least one alcohol residue has the same carbon number as in the case of said alcohols.

The method for preparation of the surface modifying mixture is not specifically limited in this invention; there may be used, for instance, a method in which an alkoxy titanate such as tetraisopropyl titanate (TPT) and water or acetic acid are reacted to prepare a titanium oligomer and the oligomer is mixed with 0.5 to 50 times by weight of an organic acid ester, or a method in which, as shown in Japanese Patent Application Kokai No. Hei 02-18463, an alkoxy titanate and a higher organic acid are reacted to prepare in situ a mixture of an ester and a titanium oligomer. Too much ester reduces the catalytic performance of the oligomer while too little ester is unable to provide sufficient hydrophobicity.

The method for producing the surface-modified magnetic powder treated with a surface modifying mixture in the present invention of a titanium oligomer and an organic acid ester is not critical. Surface modification of the magnetic powder can be accomplished by a generally employed method, for example, a dry method in which the surface modifying mixture is directly added to the magnetic powder and uniformly dispersed with a ribbon mixer, Henschel mixer or other suitable means, or a wet method in which a filler is immersed in a solution and then the solvent is removed. Also, the integral blending method in which the surface modifying mixture is added in the course of mixing of the organic matrix and magnetic powder can effectivly be used. In this way, the particle surface of the magnetic powder particles is uniformly coated with the surface modifying mixture oto provide a surface-modified magnetic powder.

The mixing ratio of the surface modifying mixture to the magnetic powder should be 0.01-10% by weight, preferably 0.1-5% by weight. If said ratio is less than 0.01% by weight, no desired effect is obtained while if said ratio exceeds 5% by weight, the softening point of the molded product lowers.

As the magnetic powder in the present invention, there can be used a powder of $\alpha$-$Fe_2O_3$, $\gamma$-$Fe_2O_3$, or these substances which have been surface treated with Co or the like; a ferrite magnetic powder composed of $MO \cdot Fe_2O_3$ (wherein M is Ba, Co, Sr, Ca, Mg, Mn, Cu, Zn or Pb), a mixture thereof, or said powder of said composition in which part of Fe atoms has been substituted with Ti, Co, Zn, V, Nb or the like; a powder of magnetite, samarium cobalt, neodymium iron cobalt, or zirconium cobalt; a Fe metal powder and that powder treated with Ti, Ni, Si, Co, Al or the like. The magnetic powder is not limited in its shape although it should be fine powder.

As for the resin, it is possible to use thermoplastic resins, thermosetting resins and in some cases elastomers.

In the case of resin magnets, there can be used, as thermoplastic resin, polyolefins such as polyethylene and polypropylene; chlorinated polyolefins such as chlorinated polyethylene; rubbers such as natural rubber, ethylene-propylene copolymer rubber, butyl rubber, butadiene rubber, isoprene rubber, nitrile rubber and chloroprene rubber; polyamides such as nylon 12, nylon 46, nylon 11, nylon 6 and nylon 66; and PPS (polyphenylenesulfide).

A conventional method can be used for preparing a resin magnet by blending a surface-modified magnetic powder and a resin. For instance, it may be prepared by kneading a surface-modified magnetic powder and a resin, followed by pelletizing and injection molding.

The mixing ratio of the resin to the surface-modified magnetic powder is preferably 4-50 to 100 parts by weight. More specifically, the ratio of the magnetic powder in the resin magnet is preferably 70-96% by weight in view of magnetic properties and moldability. This is synonymouns with the mixing of 4-50 parts by weight of resin and 100 parts by weight of magnetic powder. It is possible to add a generally used resin additive such as placticizer, crosslinking agent, etc.

Now, the magnetic toner will be discussed.

The resins usable for the magnetic toner include polyethylene, ethylene-vinyl acetate copolymer, styrene-acryl copolymer, polyester, epoxy resin, polyamide resin and the like. These binders may be used in combination.

For preparing a magnetic toner by blending said surface-modified magnetic powder and a magnetic toner resin such as mentioned above, both are for instance kneaded together, pelletized and pulverized. The mixing ratio of the resin to the surface-modified magnetic powder is 5-200 to 10 parts by weight for the reasons of magnetic properties and processability. Kneading and pulverization are performed for reducing the mixture into a fine powder with a particle size of 5-50 $\mu$m for the reasons of flow characteristics, etc.

The thus obtained magnetic fine powder is made into a magnetic toner by blending a fluidizing agent. As such fluidizing agents, there can be used colloidal silica, metal soap, nonionic surface active agent, silicone varnish, etc. Other conventional toner additives such as electric charge regulator can be used as well.

The fluidizing agent is preferably mixed in an amount of 0.1-5% by weight based on the magnetic fine powder for the reasons of flow characteristics, etc.

Lastly, the magnetic recording material will be described.

As the organic binder (resin for magnetic recording), there can be used, for example, polyester, polyurethane, polyvinyl chloride, its copolymers with vinyl acetate or vinylidene chloride, polyacrylonitrile, its compolymer with vinylidene chloride, nitrile rubber, alkyd resin, polyamide, polyvinyl acetate, polyvinyl butyral, cellulose resin and epoxy resin. These binders may be used in combination.

The amount of the organic binder used should be in the range of 15-60% by weight based on the surface-modified magnetic powder. A smaller amount of the organic binder results in a reduced adhesive force of the coat while a greater amount of the organic binder leads to a decrease in reproducing output.

A conventional method can be employed for preparing a coating material by blending said surface-modified magnetic powder, organic binder and solvent.

The solvent used here is preferably the one which is capable of dissolving the organic binder and has a boiling point of 50°–150° C. If the boiling point of the solvent is below said range, the solvent may be dried up before orientation of magnetic field and if the boiling point of the solvent is above said range, it will become hard to dry the solvent. As for the amount of the solvent blended, it is preferably added in an amount of 1–5 parts by weight per 1 part by weight of the organic binder for the reasons of viscosity characteristics, etc.

Conventional techniques can be used for preparing a magnetic recording material by coating said magnetic coating material on a substrate resin and drying the coat.

As the substrate resin on which the magnetic coating material is applied, there can be used the film-like moldings of plyethylene terephthalate, polycarbonate, polypropylene, polyvinyl chloride, cellulose triacetate and the like.

The excellent dispersibility of the surface-modified magnetic powder of this invention, which is noted when said powder is filled in an organic matrix, can be accounted for by the following mechanism;

In case a titanium oligomer has a hydrophobic group, it is generally theorized that such titanium compound is bonded to the surface of the inorganic material to make its surface hydrophobic. Covalent bonding or hydrogen bonding is involved in this phenomenon. On the other hand, in case the titanium oligomer is unable to perfectly cover the inorganic material surface or in case the titanium oligomer has no hydrophobic group, there takes place the following phenomenon. In many cases, surface water stays adsorbed on the hydrophilic inorganic material surface through hydrogen bonds, and when surface treatment is made with a higher fatty acid or other agnet, such an agent is orientated on the surface through the interposition of surface water, so that the agent tends to separate from the surface.

On the contrary, the surface modifying mixture used in this invention has the action to chemically remove surface water. That is, the organic acid ester (the abovementioned phosphoric or pyrophosphoric acid ester) is hydrolyzed into an organic acid (phosphoric or pyrophosphoric acid ester having at least one higher alcohol) and an alcohol (at least one lower alcohol) by the action of surface water in the presence of a titanium oligomer having an ester exchange catalyst activity. This reaction removes surface water which is impedimental to surface treatment, and further the resulting organic acid is orientated directly at or close to the location where the surface water has been adsorbed on the particle surface of the inorganic material (magnetic powder). In view of the strength of adsorption of surface water, it is certain that adsorption of said organic acid to the particle surface would be very strong.

Because of the above-described mechanism, there is no need of specifying the filler to be applied in this invention provided that such a filler has a functional group capable of being hydrogen-bonded to the organic acid and also has surface water.

It is to be noted that no surface modifying effect can be obtained by the single use of an ester or a titanium oligomer having no hydrophobic groups in the molecule; it has been confirmed that the desired effect can be realized from a joint use of said two substances. In the above mechanism, the organic acid ester needs to be hydrolyzed by surface water, so when a titanium compound having many hydrolyzable groups, for example, tetraisopropyl titanate (TPT) is used, the desired effect can not be obtained since TPT consumes surface water before the ester is hydrolyzed. In view of this, it is desirable to use a titanium oligomer which has been condensed to a high degree. It is thought that the above reaction proceeds as the produced volatile alcohol gets out of the system to displace the equilibrium of the esterification reaction.

As described above, the magnetic powder which has been surface modified by a surface modifying mixture comprising a titanium oligomer and an organic acid ester is remarkably improved in magnetic powder dispersibility owing to the bettered compatibility of the magnetic powder with the organic matrix as a result of decrease in surface energy of the magnetic powder particles.

EXAMPLES

The present invention will hereinafter be described more particularly by showing some examples thereof. It is to be understood, however, that these examples are merely intended to illustrate the substance of this invention more definitely and not to be construed as limiting the scope of the invention.

Example 1 (Resin magnet)

To 15 g (52.8 mmol) of tetraisopropyl titanate, 10.2 g (170 mmol, 3.2 eq.) of acetic acid was slowly added dropwise with stirring at room temperature, and the mixture was heated with stirring for reaction at reflux temperature for 2.5 hours. In the course of this operation, the reaction solution which had been initially transparent became gradually cloudy. Then, the reaction by-products isopropyl alcohol and isopropyl acetate and the unreacted acetic acid were distilled away under reduced pressure, and further the still remaining acetic acid was removed as an azeotrope with toluene to obtain a white powder (titanium oligomer). This product had a melting point above 200° C. but was soluble in chloroform. A chloroform (490 parts by weight) solution of the titanium oligomer (1 part by weight) and isopropyl isostearate (9 parts by weight) was prepared, and this solution was labeled as surface modifying mixture solution.

To 50 parts by weight of this surface modifying mixture solution was added and mixed 100 parts by weight of strontium ferrite, and then the chloroform was distilled away at 50° C. with a rotary evaporator. The residue was dried under reduced pressure at 80° C. to obtain a treated powder.

92 parts by weight of the treated powder (surface-modified magnetic powder), 10 parts by weight of butyl rubber, 1.5 parts by weight of tetramethylthiuram monosulfide and 0.5 parts by weight of mercaptobenzothiazole were mixed, and the mixture was kneaded with a press kneader for 15 minutes and then further kneaded with a calender roll at 80° C. The resulting kneaded material was molded into a 2 mm thick sheet and its tensile strength was measured using a TENSILON RTM-500, ex Orientec Corporation.

The result is shown in Table 1.

Example 2 (Resin magnet)

To 10 g (35.2 mmol) of tetraisopropyl titanate, 32 g (112.7 mmol, 3.2 eq.) of isostearic acid was slowly added dropwise with stirring at room temperature, and the mixture was heated with stirring for reaction at reflux temperature for 2.5 hours. The reaction by-product isopropyl alcohol was distilled away under reduced pressure to obtain a brown liquid. By using this liquid, there was obtained a surface modifying mixture consisting of a titanium oligomer and isopropyl isostearate in a ratio of 1:2. 10 parts by weight of this surface modifying mixture was dissolved in 490 parts by weight of chloroform to prepare a surface modifying mixture solution.

A sheet-like kneaded product was prepared in the same way as in Example 1 except for the use of said surface modifying mixture solution in place of the one obtained in Example 1, and the tensile strength of the sheet-like product was measured i the same way as in Example 1.

The result is shown in Table 1.

Example 3 (Resin magnet)

To 10 g (4.16 mmol) of isopropyl titanate having an average degree of polymerization of 10 was added dropwise 1.3 g (4.58 mmol, 1.1 eq.) of isostearic acid. The mixture was stirred at 40° C. for reaction for 2 hours while removing the reaction by-product isopropyl alcohol under reduced pressure to obtain a light brown liquid (titanium oligomer). A chloroform (490 parts by weight) solution of the obtained titanium oligomer (1 part by weight) and isopropyl isostearate (9 parts by weight) was prepared, and this solution was labeled as surface modifying mixture solution.

A sheet-like kneaded product was prepared in accordance with Example 1 except for the use of the surface modifying mixture solution in place of the one obtained in Example 1, and the tensile strength of the sheet-like product was measured in the same way as in Example 1.

The result is shown in Table 1.

Example 4 (Resin magnet)

To 10 g (4.16 mmol) of isopropyl titanate with an average condensation degree of 10 was added dropwise 17.8 g (62.7 mmol, 15.1 eq.) of isostearic acid. The mixture was stirred for reaction at 40° C. for 4.5 hours, and then the reaction by-product isopropyl alcohol was removed under reduced pressure to obtain a light brown liquid (titanium oligomer). There was prepared a hexane (490 parts by weight) solution of the obtained titanium oligomer (5 parts by weight) and isopropyl isostearate (5 parts by weight), as a surface modifying mixture solution.

Then, a sheet-like kneaded product was prepared in accordance with Example 1 except for the use of the surface modifying mixture solution in place of the one obtained in Example 1, and the tensile strength of the sheet-like product was measured in the same way as in Example 1.

The result is shown in Table 1.

Comparative Example 1

A sheet-like kneaded product was prepared and its tensile strength was measured in the same way as in Example 1 except for the use of non-treated strontium ferrite.

The result is shown in Table 1.

Comparative Example 2

A sheet-like kneaded product was prepared and its tensile strength was measured in the same way as in Example 1 except that a titanium oligomer solution prepared by dissolving 10 parts by weight of the titanium oligomer obtained in Example 1 in 490 parts by weight of chloroform was used in place of the surface modifying mixture solution obtained in Example 1.

The result is shown in Table 1.

Comparative Example 3

A sheet-like kneaded product was prepared and its tensile strength was measured in the same way as in Example 1 except that an ester solution prepared by dissolving 10 parts by weight of isopropyl isostearate in 490 parts by weight of chloroform was used in place of the surface modifying mixture solution obtained in Example 1.

The result is shown in Table 1.

Comparative Example 4

A sheet-like kneaded product was prepared and its tensile strength was measured in the same way as in Example 1 except that a chloroform (490 parts by weight) solution of the titanium oligomer (10 parts by weight) obtained in Example 1 was used in place of the surface modifying mixture solution prepared in Example 1.

The result as shown in Table 1.

TABLE 1

Tensile strength of strontium ferrite/butyl rubber compositions

|  | Tensile strength (kgf/cm$^2$) |
|---|---|
| Example 1 | 49 |
| Example 2 | 48 |
| Example 3 | 45 |
| Example 4 | 45 |
| Comp. Example 1 | 8 |
| Comp. Example 2 | 10 |
| Comp. Example 3 | 15 |
| Comp. Example 4 | 40 |

From Table 1, it is understood that the resin magnets of the invention have a higher tensile strength, which, in turn, means that they are improved in dispersibility.

Example 5 (Resin magnet)

100 parts by weight of strontium ferrite was added to and mixed with 50 parts by weight of the surface modifying mixture solution obtained in Example 1, and then the chloroform was distilled away under reduced pressure at 50° C. with a rotary evaporator. The residue was dried in vacuo at 80° C. to obtain a treated powder.

170 parts by weight of this treated powder (surface-modified magnetic powder) and 30 parts by weight of PPS were kneaded with a laboplast mill at 315° C. and 40 r.p.m. for 4 minutes and the kneaded material was press molded into a disc and its flow characteristics were determined by a flow tester KOKA FLOW-TESTER ex Shimadzu Corporation.

The result is shown in Table 2.

Example 6 (Resin magnet)

A disc-like molding was made and its flow characteristics were determined in the same way as in Example 5 except that the surface modifying mixture solution obtained in Example 2 was used in place of the one obtained in Example 1.

The result is shown in Table 2.

Example 7 (Resin magnet)

A disc-like molding was obtained and its flow characteristics were determined in the same way as in Example 5 except for the use of the surface modifying mixture solution obtained in Example 3 in place of the one obtained in Example 1.

The result is shown in Table 2.

Example 8

A disc-like molding was obtained and its flow characteristics were determined in the same way as in Example 5 except for the use of the surface modifying mixture solution of Example 4 in place of that of Example 1.

The result is shown in Table 2.

Comparative Example 5

A disc-like molding was obtained and its flow characteristics were determined in the same way as in Example 5 except for the use of non-treated strontium ferrite.

The result is shown in Table 2.

Comparative Example 6

A disc-like molding was obtained and its flow characteristics were determined in the same way as in Example 5 except for the use of the titanium oligomer solution prepared in Comparative Example 2 in place of the surface modifying mixture solution obtained in Example 1.

The result is shown in Table 2.

Comparative Example 7

A disc-like molding was obtained and its flow characteristics were determined in the same way as in Example 5 except for the use of the ester solution prepared in Comparative Example 3 in place of the surface modifying mixture solution obtained in Example 1.

The result in shown in Table 2.

Comparative Example 8

A disc-like molding was obtained and its flow characteristics were determined in the same way as in Example 5 except for the use of the surface modifying mixture solution prepared in Comparative Example 4 in place of the one obtained in Example 1.

The result is shown in Table 2.

TABLE 2

| Flow characteristics of strontium ferrite/PPS compositions | |
|---|---|
| | Flow index (g/10 min) |
| Example 5 | 28 |
| Example 6 | 26 |
| Example 7 | 26 |
| Example 8 | 25 |
| Comp. Example 5 | 8 |
| Comp. Example 6 | 8 |
| Comp. Example 7 | 9 |
| Comp. Example 8 | 22 |

From Table 2, it is understood that the resin magnets of the invention have a higher flow index, which, in turn, means that they are improved in dispersibility.

Example 9 (Resin magnet)

With 100 parts by weight of samarium cobalt was mixed 50 parts by weight of the surface modifying mixture solution obtained in Example 1, and then the chloroform was distilled away under reduced pressure at 40° C.

100 parts by weight of the obtained treated magnetic powder (surface-modified magnetic powder) and 6 parts by weight of nylon 46 were mixed, and the mixture was kneaded, pelletized and injection molded at 15 KOe.

The magnetic properties of the molded product were determined, the results being shown in Table 3.

Comparative Example 9

A molded product was obtained and its magnetic properties were determined in the same way as in Example 9 except for the use of non-treated samarium cobalt.

The results are shown in Table 3.

TABLE 3

| Magnetic properties of samarium cobalt/nylon 46 compositions | | | |
|---|---|---|---|
| | Br | BHc | (BH)max |
| Example 9 | 6.4 | 4.3 | 9.3 |
| Comp. Example 9 | 6.0 | 4.0 | 8.0 |

Br: KG; BHc: KOe; (BH)max: MGOe

From Table 3, it is understood that the regin magnet of the invention is improved in magnetic properties.

Example 10 (Resin magnet)

With 100 parts by weight of γ-ferrite powder was mixed 50 parts by weight of the surface modifying mixture solution obtained in Example 1, and the chloroform was distilled away under reduced pressure at 40° C. to obtain a surface-modified magnetic powder. With 100 parts by weight of this surface treated magnetic powder was mixed 11 parts by weight of nylon 6, and the mixture was kneaded, pelletized and injection molded.

The magnetic properties of the molded product are shown in Table 4.

Comparative Example 10

The procedure of Example 10 was followed except for the use of the surface modifying mixture solution prepared in Comparative Example 4 in place of the one obtained in Example 1, and the magnetic properties of the molded product were determined.

The results are shown in Table 4.

Comparative Example 11

The procedure of Example 10 was followed except for the use of non-treated γ-ferrite.

The magnetic properties of the molded product are shown in Table 4.

TABLE 4

|  | Magnetic properties of γ-ferrite/nylon 6 compositions | | |
|---|---|---|---|
|  | Br | BHc | (BH)max |
| Example 10 | 2.9 | 2.3 | 1.9 |
| Comp. Example 10 | 2.7 | 2.3 | 1.8 |
| Comp. Example 11 | 2.6 | 2.3 | 1.5 |

From Table 4, it is understood that the regin magnet of the invention is improved in magnetic properties.

Example 11 (Magnetic toner)

50 parts by weight of the surface modifying mixture obtained in Example 1 (1 part by weight calculated as surface modifying mixture) was added to 100 parts by weight of a magnetic powder, here magnetite EPT-1000, ex Toda Kogyo KK. After stirring for 10 minutes, the chloroform was distilled away under reduced pressure at 60° C. to obtain a treated powder (surface-modified magnetic powder). Meanwhile, 528 parts by weight of polyoxyethylene-(2,2) -2,2-bis (4-hydroxyphenyl) propane was placed in a four-necked flask and heated to 50° C. while replacing the atmosphere with nitrogen, followed by addition of 90 parts by weight of terephthalic acid, 45 parts by weight of isophthalic acid and 76 parts by weight of trimellitic acid. The mixture was heated with stirring at 210° C. for 5 hours while removing the reaction-produced water, and then cooled.

A mixture of 100 parts by weight of the thus obtained polyester, 65 parts of the treated magnetic powder, 5 parts by weight of a low-molecular weight polypropylene (VISCOL 660 P, ex Sanyo Kasei Kogyo KK) and 2 parts by weight of chromium 3,5-di-t-butylsalicylate was heated and kneaded with a roll kneader, and thereafter cooled to room temperature. The mixture was then ground with an ultrasonic jet mill and classified to obtain a one-component black toner with a particle size of 5~20 μm.

This toner was added with colloidal silica and supplied to an electrophotographic copying machine of one-component developing system to conduct a copying test.

There were obtained the clear-cut images with high density.

Example 12 (Magnetic toner)

A toner was obtained and subjected to a copying test in the same way as in Example 11 except for the use of the surface modifying mixture solution obtained in Example 2 in place of the one prepared in Example 1.

There were obtained the clear-cut images.

Example 13 (Magnetic toner)

A toner was obtained and subjected to a copying test in accordance with Example 11 except for the use of the surface modifying mixture solution obtained in Example 3 in place of the one prepared in Example 1.

There were obtained the clear-cut images.

Example 14 (Magnetic toner)

A toner was obtained and subjected to a copying test by following the procedure of Example 11 except for the use of the surface modifying mixture solution obtained in Example 4 in place of the one prepared in Example 1.

There were obtained the clear-cut images.

Comparative Example 12

A black toner was prepared according to the procedure of Example 11 except for the use of a non-treated magnetic powder in place of the surface-modified magnetic powder, and the toner was supplied to an electrophotographic copying machine of one-component development system to conduct a copying test.

The obtained images had blurs and were low in black color definition.

Comparative Example 13

A black toner was prepared by following the procedure of Example 11 except for the use of the titanium oligomer solution obtained in Comparative Example 2 in place of the surface modifying mixture solution obtained in Example 1, and the toner was supplied to an electrophotographic copying machine of one-component development system to conduct a copying test.

The obtained images had blurs and were low in black color definition.

Comparative Example 14

A black toner was prepared by following the procedure of Example 11 except for the use of the ester solution obtained in Comparative Example 3 in place of the surface modifying mixture solution obtained in Example 1, and the toner was supplied to an electrophotographic copying machine of one-component development system to conduct a copying test.

The obtained images had blurs and were low in black color definition.

Comparative Example 15

A black toner was prepared by following the procedure of Example 11 except for the use of the surface modifying mixture solution obtained in Comparative Example 4, and the toner was supplied to an electrophotographic copying machine of one-component development system to conduct a copying test.

The obtained images had no blurs but were rather low in black color definition.

From the results of Examples 11–14 and Comparative Examples 12–15, it is understood that the magnetic toners of the invention give clear-cut images with high density attributable to improved flow characteristics and improved magnetic properties.

Example 15 (Magnetic recording material)

100 parts by weight of the surface modifying mixture solution obtained in Example 1 (2 parts by weight as surface modifying mixture) was added to 100 parts by weight of Co-treated $\gamma$-$Fe_2O_3$ (particle diameter: 0.03 μm, length: 0.35 μm). The mixture was stirred for 10 minutes and then the chloroform was distilled away at 60° C.

To 100 parts by weight of the resulting powder (surface-modified magnetic powder) were added 20 parts by weight of a vinyl chloridevinyl acetate copolymer (produced by Union Carbide Co., Ltd.), 20 parts by weight of a polyurethane resin (produced by Nippon Polyurethane Industries Co., Ltd.), 80 parts by weight of cyclohexanone and 80 parts by weight of methyl ethyl ketone, and the mixture was kneaded with a ball mill for 48 hours and then further mixed with 15 parts by weight of COLONATE L (polyurethane, ex Nippon Polyurethane Industries Co., Ltd.) to obtain a magnetic coating material.

This coating material was applied on a polyethylene terephthalate film (12 μm thick) and, after magnetic orientation, dried to form a 7 μm thick coat, followed by calendering. The squareness, residual magnetic flux density and abrasive resistance of the obtained magnetic tape were examined. Regarding abrasive resistance, the tape was rubbed 5,000 times with a taper type abrasion tester and the state of abrasion was observed visually.

The results are shown in Table 5.

Example 16 (Magnetic recording material)

A magnetic tape was made by following the procedure of Example 15 except for the use of the surface modifying mixture solution obtained in Example 2 in place of the one prepared in Example 1, and the squareness, residual magnetic flux density and abrasive resistance of the magnetic tape were examined.

The results are shown in Table 5.

Example 17 (Magnetic recording material)

A magnetic tape was made by following the procedure of Example 15 except for the use of the surface modifying mixture solution obtained in Example 3 in place of the one obtained in Example 1, and the squareness, residual magnetic flux density and abrasive resistance of the magnetic tape were examined.

The results are shown in Table 5.

Example 18 (Magnetic recording material)

A magnetic tape was made by following the procedure of Example 15 except for the use of the surface modifying mixture solution obtained in Example 4 in place of the one obtained in Example 1, and the squareness, residual magnetic flux density and abrasive resistance of the magnetic tape were examined.

The results are shown in Table 5.

Comparative Example 16

A magnetic tape was made by following the process of Example 15 except for the use of a non-treated magnetic powder in place of the treated powder (surface-modified magnetic powder), and the squareness, residual magnetic flux density and abrasive resistance of the magnetic tape were examined.

The results are shown in Table 5.

Comparative Example 17

A magnetic tape was made by repeating the process of Example 15 except for the use of the titanium oligomer solution obtained in Comparative Example 2 in place of the surface modifying mixture solution obtained in Example 1, and the squareness, residual magnetic flux density and abrasive resistance of the magnetic tape were examined.

The results are shown in Table 5.

Comparative Example 18

A magnetic tape was made according to the procedure of Example 15 except for the use of the ester solution obtained in Comparative Example 3 in place of the surface modifying mixture solution obtained in Example 1, and the squareness, residual magnetic flux density and abrasive resistance were examined.

The results are shown in Table 5.

Comparative Example 19

A magnetic tape was made by following the procedure of Example 15 except for the use of the surface modifying mixture solution obtained in Comparative Example 4 in place of the one prepared in Example 1, and the squareness, residual magnetic flux density and abrasive resistance were examined.

The results are shown in Table 5.

TABLE 5

| | Squareness, residual magnetic flux density and abrasive resistance of magnetic tapes | | |
|---|---|---|---|
| | Squareness | Residual magnetic flux density | Abrasive resistance |
| Example 15 | 0.89 | 1,400 | Good |
| Example 16 | 0.88 | 1,450 | Good |
| Example 17 | 0.88 | 1,450 | Good |
| Example 18 | 0.86 | 1,400 | Good |
| Comp. Example 16 | 0.80 | 1,300 | Poor |
| Comp. Example 17 | 0.84 | 1,350 | Good |
| Comp. Example 18 | 0.81 | 1,320 | Poor |
| Comp. Example 19 | 0.81 | 1,330 | Poor |

From Table 5, it is understood that the magnetic tapes of the invention are improved in magnetic properties and abrasive resistance attributable to improved dispersibility.

Effect of the Invention

As described above, the magnetic materials with a surface modifying mixture consisting of a titanium oligomer and an organic acid ester incorporated thereinto exhibited excellent performance. That is, resin magnets are markedly improved in flow characteristics and magnetic properties, toners are excellent in printing quality and resolution, and magnetic recording materials show excellent magnetic and surface properties, because magnetic powder can be well dispersed in organic binders.

What is claimed is:

1. A magnetic toner comprising (i) a fine powder having a particle size of 5 to 50 μm and prepared by mixing and pulverizing 5 to 200 parts by weight of a resin and 10 parts by weight of a surface-modified magnetic powder in respect of which the surface of the magnetic powder particles has been coated uniformly with a surface modifying mixture consisting of 1 part by weight of a isopropyl titanium oligomer having an average degree of polymerization of 10 and having ester exchange catalyst activity, and 9 parts by weight of isopropyl isostearate in an amount of 0.01 to 10% by weight based on the said magnetic powder, and (ii) 0.1 to 5% by weight based on the said fine powder of a fluidizing agent.

* * * * *